(12) United States Patent
Peterson et al.

(10) Patent No.: US 11,600,835 B2
(45) Date of Patent: Mar. 7, 2023

(54) EFFICIENT BYPRODUCT HARVESTING FROM FUEL CELLS

(71) Applicant: Microsoft Technology Licensing, LLC, Redmond, WA (US)

(72) Inventors: Eric Clarence Peterson, Woodinville, WA (US); Sean Michael James, Olympia, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 17/338,969

(22) Filed: Jun. 4, 2021

(65) Prior Publication Data

US 2021/0296671 A1 Sep. 23, 2021

Related U.S. Application Data

(62) Division of application No. 16/191,636, filed on Nov. 15, 2018, now Pat. No. 11,056,702.

(51) Int. Cl.
| | |
|---|---|
| *H01M 8/0612* | (2016.01) |
| *H01M 8/04089* | (2016.01) |
| *H01M 8/04746* | (2016.01) |
| *H01M 8/0656* | (2016.01) |

(52) U.S. Cl.
CPC ..... *H01M 8/0618* (2013.01); *H01M 8/04097* (2013.01); *H01M 8/04753* (2013.01); *H01M 8/0656* (2013.01)

(58) Field of Classification Search
CPC .......... H01M 8/0618; H01M 8/04097; H01M 8/04753; H01M 8/0656
See application file for complete search history.

(56) References Cited

FOREIGN PATENT DOCUMENTS

JP 5137199 * 2/2013

* cited by examiner

*Primary Examiner* — Sarah A. Slifka
(74) *Attorney, Agent, or Firm* — Ray Quinney & Nebeker P.C.; Paul N. Taylor (57) ABSTRACT

Fuel cell systems configured for efficient byproduct recovery and reuse are disclosed herein. In one embodiment, a fuel cell system includes a reformer configured to reform a fuel containing methane ($CH_4$) with steam to produce a reformed fuel having methane ($CH_4$), carbon monoxide (CO), and hydrogen ($H_2$). The fuel cell system also includes a fuel cell configured to perform an electrochemical reaction between a first portion of the reformed fuel and oxygen ($O_2$) to produce electricity and an exhaust having carbon dioxide ($CO_2$), water ($H_2O$), and a second portion of the reformed fuel. The fuel cell system further includes an oxygen enricher configured to generate an oxygen enriched gas and a combustion chamber configured to combust the second portion of the reformed fuel with the oxygen enriched gas.

20 Claims, 5 Drawing Sheets

EFFICIENT BYPRODUCT HARVESTING FROM FUEL CELLS

CROSS-REFERENCE TO RELATED APPLICATION(S)

This application is a divisional application of and claims priority to U.S. patent application Ser. No. 16/191,636, filed on Nov. 15, 2018.

BACKGROUND

A fuel cell is an electrochemical cell that converts chemical energy from a fuel into electricity through an electrochemical reaction between the fuel and an oxidizing agent such as oxygen. Example fuels can include hydrogen ($H_2$), carbon monoxide (CO), natural gas (e.g., methane, propane, and butane), or other suitable compounds. A fuel cell typically has an anode, a cathode, and an electrolyte between the anode and the cathode. The electrolyte can be a liquid or solid that allows charged particles, such as oxygen anions or protons, to travel between the cathode and the anode. The charged particles can then react with the fuel or oxygen to produce heat and byproducts such as carbon dioxide ($CO_2$) and water ($H_2O$).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Solid oxide fuel cells (SOFCs) are a type of fuel cells that use a solid material, such as yttria-stabilized zirconia (YSZ) ceramic, as an electrolyte. SOFCs can be made entirely of solid materials, and thus are not limited to planar configurations. Instead, SOFCs are often designed as rolled tubes that can be installed in various suitable arrangements. SOFCs can use a variety of fuels including methane, propone, butane, or other suitable hydrocarbons. In one example fuel cell system, a natural gas containing methane ($CH_4$) is initially reformed with water/steam ($H_2O$) in a reformer to at least partially convert the methane into hydrogen ($H_2$) and carbon monoxide (CO), as follows:

$$CH_4 + H_2O + heat \rightarrow CO + 3H_2$$

The reformed fuel containing unreacted methane, carbon monoxide, and hydrogen can then be introduced into the anode of a SOFC.

During operation, air containing oxygen is introduced into the cathode of the SOFC. Oxygen in the introduced air at the cathode can then absorb electrons from the cathode to generate oxygen anions ($O^-$), as follows:

$$O_2 + 2e^- \rightarrow 2O^-$$

The generated oxygen anions ($O^-$) can then be transported through the solid electrolyte toward the anode of the SOFC. At the anode, the oxygen anions react with hydrogen and carbon monoxide from the reformed fuel to produce electricity and byproducts, such as carbon dioxide ($CO_2$) and water ($H_2O$), as follows:

$$2H_2 + 2O^- \rightarrow 2H_2O + 2e^-$$

$$CO + O^- \rightarrow CO2 + e^-$$

In SOFCs, solid electrolyte physically separates the flow of air on the cathode side and reformed fuel on the anode side. As such, upon completion of the above reactions at the anode, exhaust from the anode side of the SOFC contains only reaction products, such as carbon dioxide and water/steam as well as unreacted excess fuel (e.g., methane, carbon monoxide, and hydrogen) but not any portion of the air introduced at the cathode side. To improve fuel efficiency of the fuel cell system, the exhaust from the anode side can be introduced into a combustion chamber at which air is mixed with the exhaust to combust the excess fuel in order to provide a portion of the needed heat for reforming additional methane in the reformer.

Even though the combusting or burning of the excess fuel can improve energy efficiency of the entire fuel cell system, burning the excess fuel in the exhaust with air can pollute the exhaust from the anode side with other undesirable molecules. For example, air contains approximately 78.09% nitrogen ($N_2$), 20.95% oxygen ($O_2$), 0.93% argon (Ar), 0.039% carbon dioxide ($CO_2$), and small amounts of other gases. As such, burning the excess fuel in the exhaust with air can pollute the exhaust with nitrogen, argon, and other gases in air. Such pollution can render recovery and reuse of the byproducts, i.e., carbon dioxide ($CO_2$) and water ($H_2O$) impractical because the pollutants (e.g., nitrogen) can be rather difficult to remove once introduced.

Several embodiments of the disclosed technology can prevent or at least reduce a degree of polluting the exhaust from the fuel cell system by combusting the excess fuel with an oxygen enriched gas instead of air. For example, in one embodiment, a gas containing enriched oxygen can be introduced into the combustion chamber to burn the excess fuel. The oxygen enriched gas can contain 90%, 95%, 99%, 99.9%, or other suitable concentrations of oxygen, or can contain a nitrogen concentration of about 5% to about 1 ppb. The oxygen enriched gas can be produced via pressure swing adsorption, air distillation, evaporation of liquid oxygen, or other suitable oxygen supplying techniques. As such, when the excess fuel is burned with the oxygen enriched gas, an amount of pollutant such as nitrogen and argon can be significantly reduced when compared to burning with air. Thus, in certain embodiments, the exhaust from the combustion chamber can contain approximately entirely of carbon dioxide and water/steam with little or an acceptable level of undesirable pollutant such as nitrogen and argon. Water can then be condensed from the exhaust to produce steam condensate and a product gas containing mainly of carbon dioxide.

In another embodiment, the fuel cell system can include a primary fuel cell stage and one or more additional fuel cell stages arranged in series. The additional fuel cell stages are configured to consume approximately all of the excess fuel in the exhaust from the primary fuel cell stage. Without being bound by theory, it is believed that operating SOFCs close to 100% efficiency can adversely affect reliability and/or useful life of the fuel cells. However, in the one or more additional fuel cell stages, each stage may be operated close to 100% relatively safely due to lower concentrations of the fuel, i.e., methane, carbon monoxide, and hydrogen in the exhaust from the primary stage. As such, by not burning the exhaust in the combustion chamber with air, the excess fuel in the exhaust from the primary stage may be completely converted into carbon dioxide and steam at the one or more additional fuel cell stages. Thus, recovery and reuse of the byproducts can be efficiently achieved.

Several embodiments of the disclosed technology can improve operating efficiencies of fuel cell systems by readily recover byproducts for reuse. By not using air but an oxygen enriched gas to combust with the excess fuel in the exhaust from the fuel cell, high quality byproducts such as carbon dioxide and steam condensate can be collected. For example, in certain implementations, the product gas after condensing the steam may contain 95% to 99% of carbon dioxide, which can be a valuable commodity. As such, the excess fuel in the exhaust is not just used for fuel value, but instead, is used to produce valuable commodities that can improve operating efficiencies of the fuel cell system.

DETAILED DESCRIPTION

Certain embodiments of systems, devices, components, and processes for efficient byproduct harvesting from fuel cells are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-4.

As used herein, a "fuel cell" generally refers to an electrochemical cell that converts chemical energy from a fuel into electricity through an electrochemical reaction between a fuel and an oxidizing agent such as air or oxygen. Example fuels can include hydrogen ($H_2$), carbon monoxide (CO), natural gas (e.g., methane, propane, and butane), or other suitable compounds. An example fuel cell typically has an anode, a cathode, and an electrolyte separating the anode from the cathode. The electrolyte can be a liquid or solid that allows charged particles, such as oxygen anions or protons, to travel from cathode to the anode or vice versa. The charged particles can then react with a fuel or oxygen to produce heat and byproducts such as carbon dioxide ($CO_2$) and water ($H_2O$). One example type of fuel cells are solid oxide fuel cells (SOFCs) that use a solid material, such as yttria-stabilized zirconia (YSZ) ceramic, as an electrolyte. SOFCs can thus be made entirely of solid materials.

Also used herein, the term "reforming" generally refers to reacting a hydrocarbon fuel with steam or water to produce a reformed fuel having hydrocarbons (e.g., methane, $CH_4$), carbon monoxide (CO), and hydrogen ($H_2$). Such reforming can be carried out in a reforming subsystem (or "reformer" as used herein) that can include a desulfurization unit, a pre-reformer, a reformer reactor, a flue gas treatment unit, and one or more heat recovery devices. A suitable reformer is provided by Air Liquide Engineering & Construction of Houston, Tex.

Further, as used herein, the term "oxygen enriched gas" generally refers to a gas having an oxygen concentration higher than 21%. In certain implementations, an oxygen enriched gas can have an oxygen concentration of about 95% to about 99%. In other implementations, an oxygen enriched gas can contain oxygen and impurities such as nitrogen at a concentration of 1 PPM to about 1 PPB. An oxygen enriched gas can be produced via pressure swing adsorption, air distillation, evaporation of liquid oxygen, or other suitable oxygen enriching techniques. A suitable evaporative oxygen system is provided by Air Liquide Engineering & Construction of Houston, Tex.

In SOFCs, oxygen anions are generated at the cathode and transported via the solid electrolyte to react with carbon monoxide and hydrogen at the anode. The solid electrolyte physically separates flows of air on the cathode side and reformed fuel on the anode side. As such, upon completion of the electrochemical reactions at the anode, exhaust from the anode side of the SOFC contains only reaction products, such as carbon dioxide and water (or steam) as well as unreacted excess fuel (e.g., containing methane, carbon monoxide, and hydrogen) but not any portion of the air introduced at the cathode. To improve fuel efficiency of the fuel cell system, the exhaust from the anode side can be introduced into a combustion chamber (sometimes referred to as an "afterburner") at which air is mixed with the exhaust to burn the excess fuel in order to provide a portion of needed heat for reforming additional fuel in the reformer.

Even though the foregoing burning of the excess fuel can improve energy efficiency of the fuel cell system, burning the excess fuel in the exhaust with air can pollute the exhaust with other undesirable compounds. For example, air contains approximately 78.09% nitrogen ($N_2$), 20.95% oxygen ($O_2$), 0.93% argon (Ar), 0.039% carbon dioxide ($CO_2$), and small amounts of other gases. As such, burning the excess fuel in the exhaust with air can pollute the exhaust with nitrogen, argon, and other gases in air. Such pollution can render recovery and reuse of the byproducts, i.e., carbon dioxide ($CO_2$) and water ($H_2O$) impractical because the pollutants (e.g., nitrogen) can be difficult to remove.

Several embodiments of the disclosed technology can prevent or at least reduce a degree of polluting the reaction products in the exhaust by burning the excess fuel with an oxygen enriched gas instead of air. For example, in one embodiment, a gas containing enriched oxygen can be introduced into the combustion chamber to react with the excess fuel. As such, when the excess fuel is burned with the oxygen enriched gas, an amount of pollutant such as nitrogen and argon can be significantly reduced when compared to burning with air. Thus, in certain embodiments, the exhaust from the combustion chamber can contain approximately all carbon dioxide and steam with little or acceptable amount of undesirable pollutant such as nitrogen and argon. Water can then be condensed from the exhaust to produce steam condensate and carbon dioxide using, for example, a cooling water. Several embodiments of the disclosed technology can thus improve operating efficiency of fuel cell systems by efficiently recover byproducts for reuse. By not using air but an oxygen enriched gas, the excess fuel in the exhaust is not just used for fuel value, but instead, is used to produce valuable commodities that can improve operating efficiencies of the fuel cell systems, as described in more detail below with reference to FIGS. 1-4.

Figure 1:
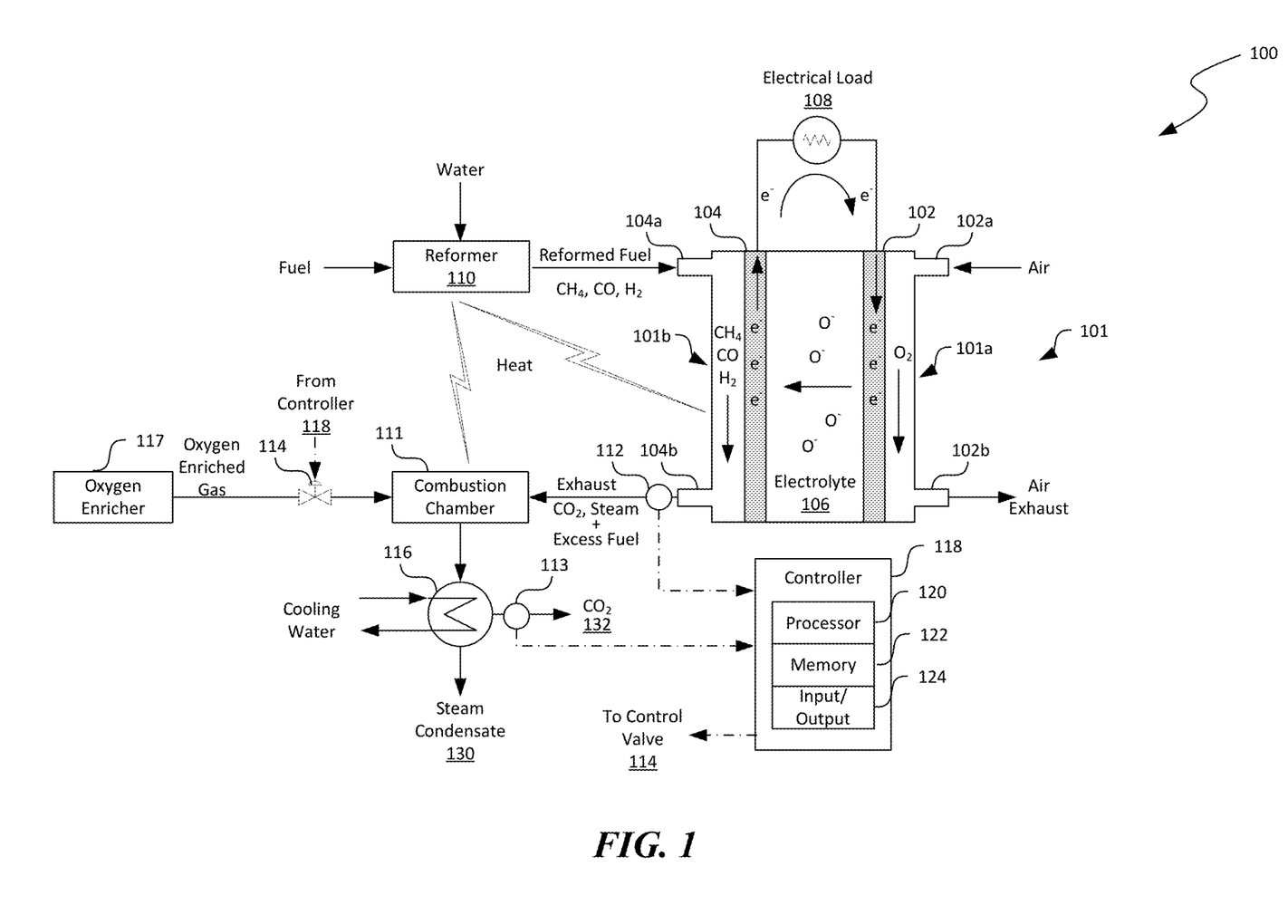
FIG. 1 is a schematic diagram of a fuel cell system implementing efficient byproduct harvesting in accordance with embodiments of the disclosed technology.

FIG. 1 is a schematic diagram of a fuel cell system 100 implementing efficient byproduct (e.g., carbon dioxide and water) harvesting in accordance with embodiments of the disclosed technology. As shown in FIG. 1, the fuel cell system 100 can include a fuel cell 101, a reformer 110, a combustion chamber 111, and an oxygen enricher 117 fluidically coupled to one another. Even though particular components of the fuel cell system 110 are shown in FIG. 1 to illustrate various aspects of the disclosed technology, in other embodiments, the fuel cell system 100 can also include other suitable components such as blowers, pumps, heat exchangers, AC/DC converters, etc.

The reformer 110 can be configured to reform a fuel, such as natural gas. In the description below, methane ($CH_4$) is used as an example of a fuel provided to the fuel cell system 100. As such, during operation, methane ($CH_4$) is initially reformed with water or steam ($H_2O$) in a reformer to at least partially convert the methane into hydrogen ($H_2$) and carbon monoxide (CO), as follows:

$$CH_4 + H_2O + heat \rightarrow CO + 3H_2$$

In other examples, the fuel can also include propane, butane, syn gas, or other suitable types of energy containing materials.

The fuel cell 101 can be of any suitable types of fuel cell. In the following description, SOFC is used as an example for illustrating aspects of the disclosed technology. In other implementations, the fuel cell 101 can be an alkali fuel cell, a phosphoric acid fuel cell, a molten carbonate fuel cell, or other suitable types of fuel cell. As shown in FIG. 1, the fuel cell 101 can include a cathode 102, an anode 104, and an electrolyte 106 separating the cathode 102 and anode 104.

The cathode 102, anode 104, and electrolyte 106 can be constructed from any suitable materials. In one example, for a SOFC, the cathode 102 and anode 104 may be constructed from doped ceria ($CeO_2$), doped lanthanum gallate ($LaGaO_3$), and doped barium zirconate ($BaZrO_3$). The electrolyte 106 may be constructed from a solid material, such as yttria-stabilized zirconia (YSZ) ceramic. In other examples, the cathode 102 and/or the anode 104 may be constructed from graphite or other suitable materials.

Also shown in FIG. 1, the fuel cell 101 can have a cathode side 101a opposite an anode side 101b due to separation of the electrolyte 106. The cathode side 101a can include an air inlet 102a for receiving air and an air outlet 102b for exhausting air after the air contacting the cathode 102 of the fuel cell 101. The anode side 101b can include a fuel inlet 104a for receiving a reformed fuel from the reformer 110 and a fuel outlet 104b for providing an exhaust gas to the combustion chamber 111 after the reformed fuel is at least partially reacted. Operations of the fuel cell 101 are described in more detail below.

In the example fuel cell system 100 in FIG. 1, methane ($CH_4$) is initially reformed with water or steam ($H_2O$) in the reformer 110 to at least partially convert the methane into hydrogen ($H_2$) and carbon monoxide (CO), as shown above. The reformed fuel containing unreacted hydrocarbons, carbon monoxide, and hydrogen can then be introduced into the anode 104 of the fuel cell 101 via the fuel inlet 104a. At the same time, air containing oxygen ($O_2$) is introduced into the cathode 102 of the fuel cell 101 via the air inlet 102a. Oxygen ($O_2$) in the introduced air at the cathode 102 can then absorb electrons to generate oxygen anions ($O^-$), as follows:

$$O_2 + 2e^- \rightarrow 2O^-$$

The electrolyte 106 can then transport the generated oxygen anions ($O^-$) from the cathode 102 toward the anode 104 of the fuel cell 101. At the anode 104, the oxygen anions ($O^-$) react with hydrogen and carbon monoxide from the reformed fuel to produce electricity to be provided to an electrical load 108 (e.g., servers in a datacenter) and byproducts, such as carbon dioxide ($CO_2$) and water ($H_2O$), as follows:

$$2H_2 + 2O^- \rightarrow 2H_2O + 2e^-$$

$$CO + O^- \rightarrow CO2 + e^-$$

In the example fuel cell 101, solid electrolyte 106 physically separates flows of air on the cathode side 101a and reformed fuel on the anode side 101b. As such, upon completion of the above reactions at the anode 104, exhaust from the anode side 101b of the SOFC contains only reaction products, such as carbon dioxide and water (or steam) as well as unreacted excess fuel (e.g., containing methane, carbon monoxide, and hydrogen) but not any portion of the air introduced at the cathode side 101a. To improve fuel efficiency of the fuel cell system 100, the exhaust from the anode side 101b can be introduced into the combustion chamber 111 at which air is mixed with the exhaust to combust the excess fuel in order to provide a portion of heat for reforming additional fuel in the reformer 110.

Even though the foregoing burning of the excess fuel can improve energy efficiency of the fuel cell system 100, burning the excess fuel in the exhaust with air can pollute the exhaust with other undesirable compounds. For example, air contains approximately 78.09% nitrogen ($N_2$), 20.95% oxygen ($O_2$), 0.93% argon (Ar), 0.039% carbon dioxide ($CO_2$), and small amounts of other gases. As such, burning the excess fuel in the exhaust with air can pollute the exhaust with nitrogen, argon, and other gases in air. Such pollution can render recovery and reuse of the byproducts, i.e., carbon dioxide ($CO_2$) and water ($H_2O$) impractical because the pollutants (e.g., nitrogen) can be difficult to remove.

Several embodiments of the disclosed technology can prevent or at least reduce a degree of polluting the exhaust from the fuel cell system 100 by burning the excess fuel with an oxygen enriched gas from the oxygen enricher 117 instead of air. The oxygen enricher 117 can include pressure swing adsorbers, air distillation towers, liquid oxygen evaporators, or other suitable oxygen enriching units. In operation, the oxygen enricher 117 can produce and provide the oxygen enriched gas to the combustion chamber 111.

The combustion chamber 111 can be configured to receive the exhaust from the anode side 101b of the fuel cell 101 and combust the excess fuel (e.g., methane, carbon monoxide, and hydrogen) with the oxygen enriched gas from the oxygen enricher 117. The oxygen enriched gas can contain 90%, 95%, 99%, 99.9%, or other suitable concentrations of oxygen or can contain a nitrogen concentration of about 5% to about 1 ppb. As such, when the excess fuel is burned with the oxygen enriched gas, an amount of pollutant such as nitrogen and argon can be significantly reduced when compared to burning with air. Thus, in certain embodiments, the exhaust from the combustion chamber 111 can contain approximately all carbon dioxide and steam with little or an acceptable amount of undesirable pollutant such as nitrogen and argon. Water can then be condensed from the exhaust, for example, with cooling water at a heat exchanger 116 to produce steam condensate 130 and a gas containing carbon dioxide 132. In certain implementations, the produced gas containing can have a carbon dioxide concentration of about 95% to about 99%. In other implementations, the produced gas can have other suitable values of carbon dioxide concentration.

As shown in FIG. 1, the fuel cell system 100 can also include a controller 118 operatively coupled to one or more sensors 112 and 113 and a flow control value 114 of the fuel cell system 100 for regulating the combustion operation at the combustion chamber 111. The sensors 112 and 113 can be configured to analyze and determine one or more concentrations of methane, carbon monoxide, hydrogen, or oxygen. In certain embodiments, the sensors 112 and 113 can include a gas chromatography unit. In other embodiments, the sensors 112 and 113 can also include other suitable types of composition analyzers.

The controller 118 can include a processor 120 coupled to a memory 122 and an input/output component 124. The processor 120 can include a microprocessor, a field-programmable gate array, and/or other suitable logic devices. The memory 122 can include non-transitory volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 120 (e.g., instructions for performing the methods discussed below with reference to FIG. 4). The input/output component 124 can include a display, a touch screen, a keyboard, a mouse, and/or other suitable types of input/output devices configured to accept input from and provide output to an operator.

In certain embodiments, the controller 118 can include a personal computer operatively coupled to the other components of the IMS system 100 via a communication link (e.g., a USB link, an Ethernet link, a Bluetooth link, etc.) In other embodiments, the controller 118 can include a network server operatively coupled to the other components of the IMS system 100 via a network connection (e.g., an internet connection, an intranet connection, etc.) In further embodiments, the controller 118 can include a process logic controller, a distributed control system, and/or other suitable computing frameworks.

As shown in FIG. 1, in certain embodiments, the sensor 112 can be configured to analyze and determine a composition of methane, carbon monoxide, and hydrogen in the exhaust from the anode side 101b. The sensor 112 can then transmit the determined concentration as an electronic signal to the controller 118. In response, the controller 118 can calculate a flow rate of the oxygen enriched gas based on a stoichiometric amount of oxygen ($O_2$) for converting the excess fuel in the exhaust into the additional carbon dioxide ($CO_2$) and water ($H_2O$). The controller 118 can then provide the calculated flow rate as a control signal to the flow control value 114 for regulating a flow rate of the oxygen enriched gas into the combustion chamber 111.

In other embodiments, the sensor 113 can be configured to analyze and determine a composition of the exhaust after combusting with the oxygen enriched gas at the combustion chamber. The sensor 113 can then provide the determined composition to the controller 118 as an electrical signal. In response, the controller 118 can be configured to determine whether a concentration of methane ($CH_4$), carbon monoxide (CO), or hydrogen ($H_2$) is above a threshold. In response to determining that the concentration of methane ($CH_4$), carbon monoxide (CO), or hydrogen ($H_2$) is above the threshold, the controller 118 can regulate the flow control valve 114 to increase the oxygen enriched gas introduced into the combustion chamber 111. Also, in response to determining that a concentration of oxygen in the exhaust is above another threshold, the controller 118 can regulate the flow control valve 114 to decrease the oxygen enriched gas introduced into the combustion chamber 111. The foregoing control actions may be performed in addition to or in lieu of the control actions based on the electrical signals from the sensor 112.

Figure 2:
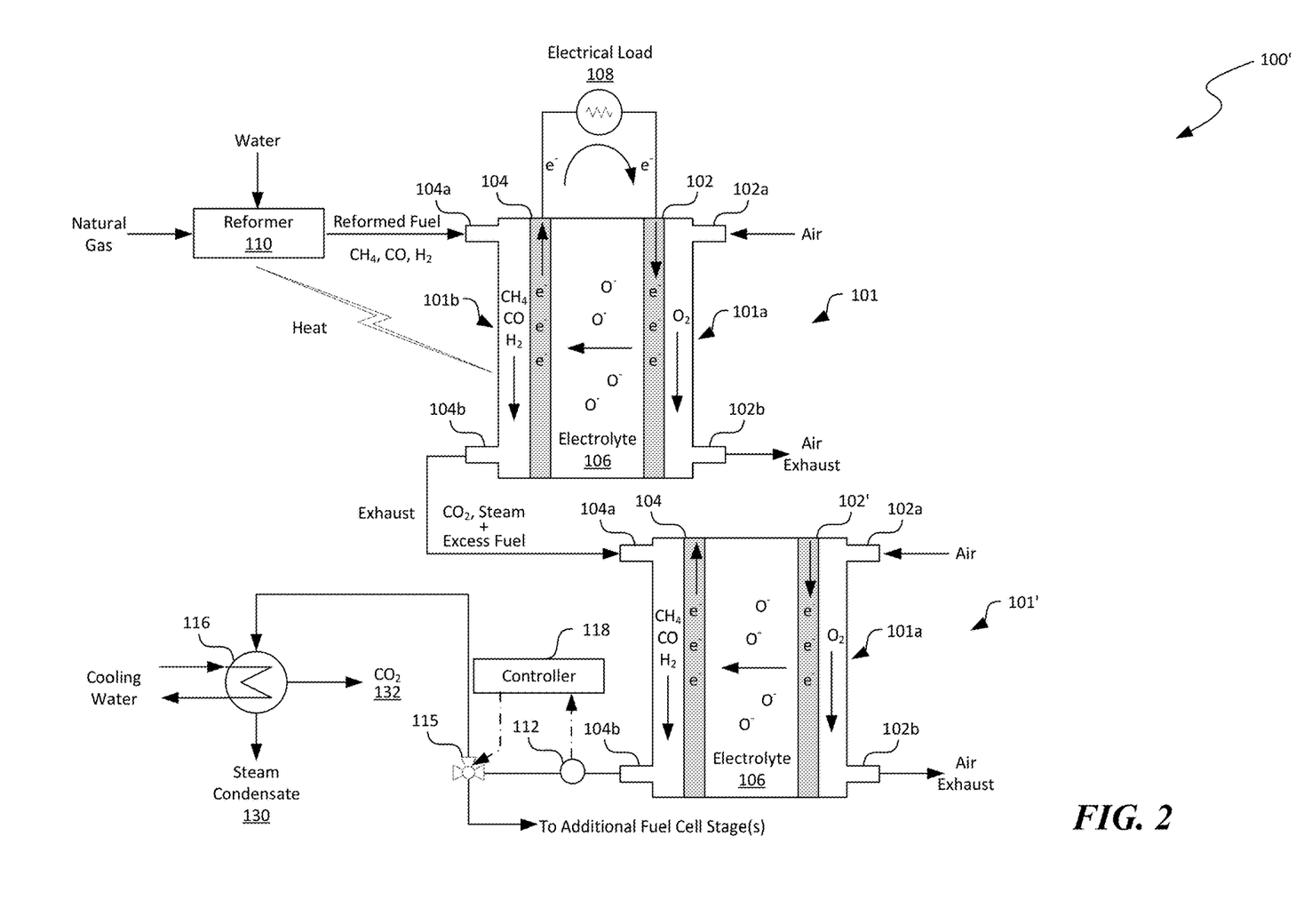
FIG. 2 is a schematic diagram of another fuel cell system implementing efficient byproduct harvesting in accordance with embodiments of the disclosed technology.

FIG. 2 is a schematic diagram of another fuel cell system 100' implementing efficient byproduct harvesting in accordance with embodiments of the disclosed technology. As shown in FIG. 2, the fuel cell system 100' can include certain components generally similar in structure and function as those in FIG. 1. For example, the fuel cell system 100' can include a reformer 110 and one or more fuel cells 102. In the illustrated embodiment, two fuel cells 102 and 102' are shown for illustration purposes. In other embodiments, the fuel cell system 100' can include three, four, or any other suitable number of fuel cells.

Unlike the fuel cell system 100 in FIG. 1, the fuel cell system 100' in FIG. 2 does not include a combustion chamber 111 (FIG. 1) for combusting excess fuel from the exhaust from the anode side 101b. Instead, the exhaust from the first fuel cell 102 is directed from the fuel outlet 104b of the first fuel cell 102 into the fuel inlet 104a of the second fuel cell 102'. In operation, excess fuel in the exhaust from the first fuel cell 102 can be converted into additional carbon dioxide and water at the second fuel cell 102' without being in contact with air introduced into the cathode side 101a of the second fuel cell 102'. As such, the exhaust from the second fuel cell 102' is not polluted with the air introduced into the cathode side 101a of the second fuel cell 102'.

As shown in FIG. 2, the fuel cell system 100' can also include a sensor 112 configured to analyze composition of the exhaust from the second fuel cell 102'. In certain embodiments, the sensor 112 can provide the determined concentration of methane, carbon monoxide, and hydrogen to the controller 118. In response, the controller 118 can determine whether the received concentration is below a threshold. In response to determining that the concentration is below the threshold, the controller 118 can instruct a diverter valve 115 to direct the exhaust from the second fuel cell 102 to the heat exchanger 116 for recovering the steam condensate 130 and the product gas 132 containing carbon dioxide. In response to determining that the concentration is not below the threshold, the controller 118 can instruct the diverter valve 115 to direct the exhaust from the second fuel cell 102 to a fuel inlet 104a of an additional fuel cell (not shown). The foregoing operations can be repeated until the concentration is below the threshold.

Figure 3A:
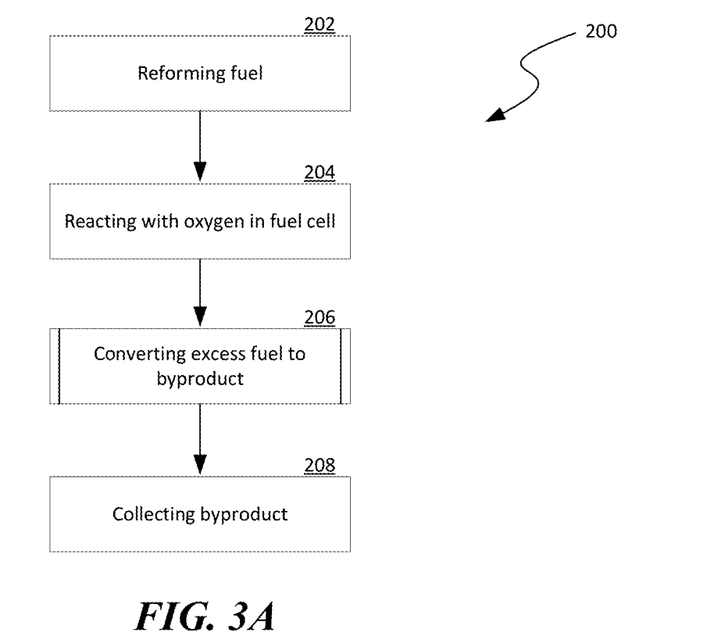
FIGS. 3A-3C are flowcharts illustrating processes of efficient byproduct harvesting in fuel cell systems in accordance with embodiments of the disclosed technology.
Figure 3B:
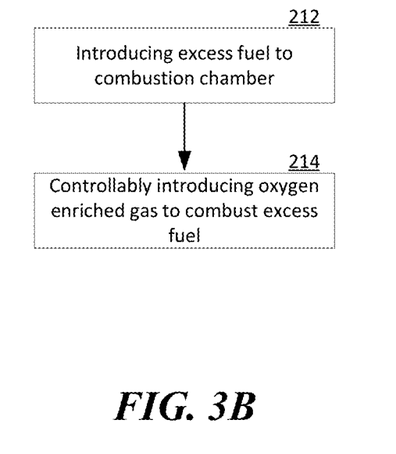
Figure 3C:
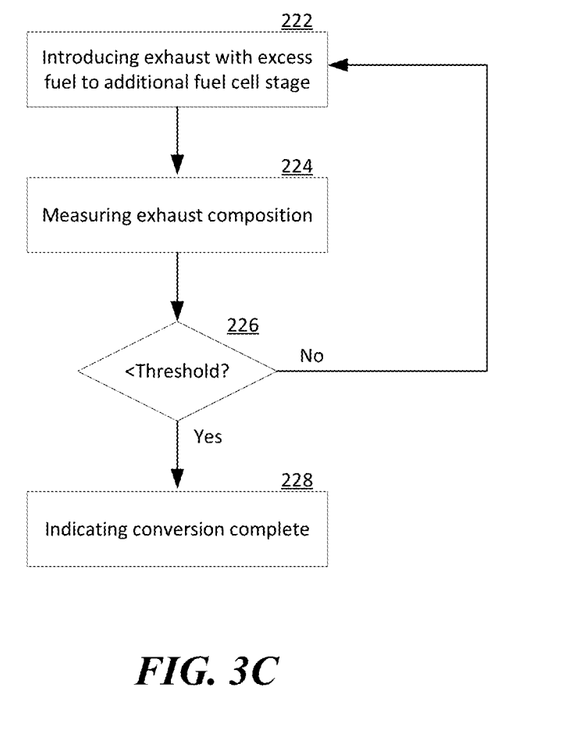

FIGS. 3A-3C are flowcharts illustrating processes of efficient byproduct harvesting in fuel cell systems in accordance with embodiments of the disclosed technology. Even though the processes are described below with reference to the fuel cell systems 100 and 100' of FIGS. 1 and 2, in other embodiments, the processes can also be implemented in fuel cell systems with additional and/or different components.

As shown in FIG. 3A, a process 200 of operating a fuel cell system can include receiving and reforming a fuel at stage 202. As described above with reference to FIG. 1, in certain embodiments, a fuel containing hydrocarbons can be reformed with steam or water to produce carbon monoxide and hydrogen. In other embodiments, reforming the fuel at stage 202 can also include separating components of the reformed fuel, by extracting, for instance, hydrogen from the reformed fuel. In further embodiments, reforming the fuel at stage 202 may be omitted.

The process 200 can then include reacting the reformed (or original) fuel with oxygen in a fuel cell at stage 204. In certain embodiments, reacting with oxygen can include transporting protons from an anode to a cathode of a fuel cell. In other embodiments, as described above with reference to FIG. 1, reacting with oxygen can include generating oxygen anions at the cathode and transporting the oxygen anions from the cathode to the anode via the electrolyte. In any of the foregoing operations, reacting the fuel with oxygen produce a reaction product containing carbon dioxide and water.

The process 200 can then include converting excess fuel in an exhaust from the fuel cell into byproduct without being polluted by components of air at stage 206. In one implementation, an oxygen enriched gas can be used to combust the excess fuel, as described above with reference to FIG. 1. In another implementation, the exhaust from one fuel cell can be introduced as fuel to another fuel cell until a concentration of excess fuel is reduced below a threshold, as described above with reference to FIG. 2. Example operations of such implementations are also described below with reference to FIGS. 3B and 3C. The process 200 can then include collecting byproduct at stage 208, for example, by condensing water from the exhaust.

FIG. 3B is a flowchart illustrating example operations of combusting excess fuel with an oxygen enriched gas. As shown in FIG. 3B, the operations can include introducing excess fuel from the exhaust into a combustion chamber at stage 212. The operations can then include controllably introducing oxygen enriched gas into the combustion chamber to combust the excess fuel at stage 214. Various control schemes and operations of controlling the introduced oxygen enriched gas are described above with reference to FIG. 1.

FIG. 3C is a flowchart illustrating example operations of consuming excess fuel with multiple fuel cell stages. As shown in FIG. 3C, the operations can include introducing exhaust having excess fuel to an additional stage of fuel cell at stage 222. The operations can then include measuring composition of exhaust from the fuel cell at stage 224. The operations can then include a decision stage 226 to determine whether a concentration of the excess fuel is below a threshold. In response to determining that the concentration of the excess fuel is below the threshold, the operations can include indicating excess fuel conversion is complete at stage 228. In response to determining that the concentration of the excess fuel is not below the threshold, the operations can include reverting to introducing the exhaust to another stage of fuel cell at stage 222.

Figure 4:
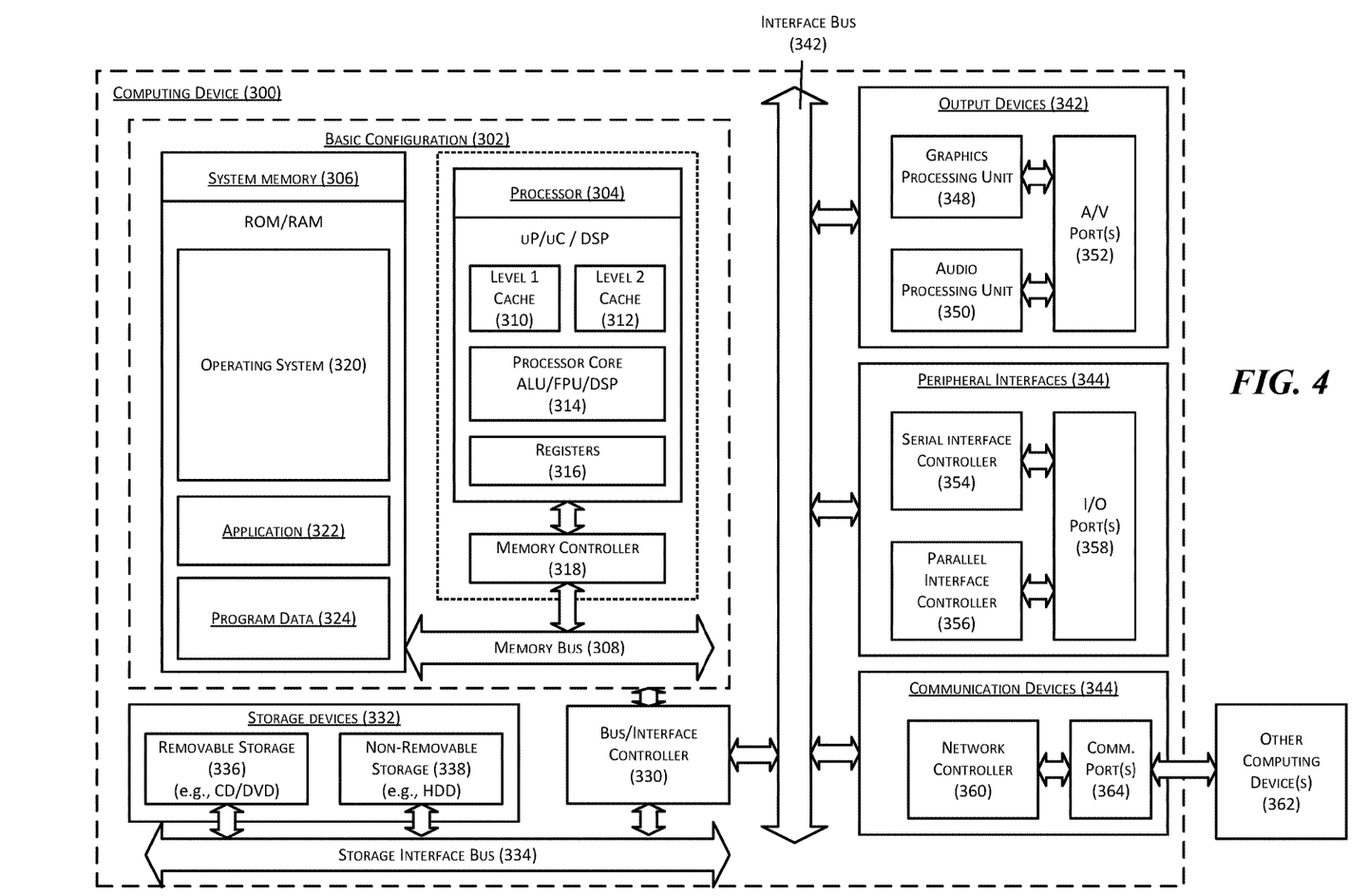
FIG. 4 is a computing device suitable for certain components of the fuel cell system in FIGS. 1 and 2.

FIG. 4 is a computing device 300 suitable for certain components of the fuel cell system 100 in FIG. 1. For example, the computing device 300 can be suitable for the controller 118 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor ($\mu$P), a microcontroller ($\mu$C), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 4 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of operating fuel cell systems, the method comprising:
reforming a fuel containing methane ($CH_4$) with steam to produce a reformed fuel having methane ($CH_4$), carbon monoxide (CO), and hydrogen ($H_2$);
introducing the reformed fuel into an anode of a first fuel cell while introducing air into a cathode of the first fuel cell;
reacting a first portion of the reformed fuel introduced to the anode with oxygen ($O_2$) in the air introduced to the cathode of the first fuel cell to produce electricity and a first exhaust from the anode of the first fuel cell, the first exhaust having carbon dioxide ($CO_2$), water ($H_2O$), and a second portion of the reformed fuel; and
introducing the first exhaust to an anode of a second fuel cell while introducing additional air into a cathode of the second fuel cell, the second portion of the reformed fuel in the first exhaust reacting with oxygen ($O_2$) in the additional air introduced to the cathode of the second fuel cell to produce additional electricity and a second exhaust from the anode of the second fuel cell, thereby converting at least a part of the second portion of the reformed fuel into additional carbon dioxide ($CO_2$) and water ($H_2O$) without contacting the introduced first exhaust with nitrogen ($N_2$) in the additional air introduced to the cathode of the second fuel cell.

2. The method of claim 1, further comprising collecting the generated water ($H_2O$) in the second exhaust as steam condensate, thereby producing a product gas having carbon dioxide ($CO_2$) having a carbon dioxide ($CO_2$) concentration of about 90% to about 99%.

3. The method of claim 1 wherein:
the first fuel cell includes an electrolyte separating the anode and the cathode, the electrolyte being a solid that physically separates the anode from the cathode; and
performing the electrochemical reaction includes:
generating oxygen anions at the cathode;
transporting the generated oxygen anions from the cathode to the anode via the solid electrolyte; and
reacting the transported oxygen anions with the first portion of the reformed fuel at the anode.

4. The method of claim 1, further comprising:
analyzing a composition of the first exhaust from the anode of the first fuel cell;
calculating a flow rate of the additional air based on a stoichiometric amount of oxygen ($O_2$) for converting the second portion of the reformed fuel into the additional carbon dioxide ($CO_2$) and water ($H_2O$); and
regulating a control valve to introduce the additional air into the second fuel cell at the calculated flow rate.

5. The method of claim 1, further comprising:
analyzing a composition of the second exhaust at the anode of the second fuel cell; and
regulating a control valve to increase a flow rate of the additional air introduced into the cathode of the second fuel cell when a concentration of methane ($CH_4$), carbon monoxide (CO), or hydrogen ($H_2$) in the second exhaust is above a threshold.

6. The method of claim 1, further comprising:
analyzing a composition of the second exhaust at the anode of the second fuel cell; and
regulating a control valve to decrease a flow rate of the additional air introduced into the cathode of the second fuel cell when a concentration of methane ($CH_4$), carbon monoxide (CO), or hydrogen ($H_2$) in the second exhaust is below a threshold.

7. The method of claim 1, further comprising:
analyzing a composition of the second exhaust at the anode of the second fuel cell; and
regulating a control valve to direct the second exhaust to an anode of a third fuel cell when a concentration of methane ($CH_4$), carbon monoxide (CO), or hydrogen ($H_2$) in the second exhaust is above a threshold.

8. The method of claim 1, further comprising:
analyzing a composition of the second exhaust at the anode of the second fuel cell; and
collecting the generated water ($H_2O$) in the second exhaust as steam condensate and producing a product gas having carbon dioxide ($CO_2$) from the second exhaust when a concentration of methane ($CH_4$), carbon monoxide (CO), or hydrogen ($H_2$) in the second exhaust is below a threshold.

9. The method of claim 1, further comprising:
analyzing a composition of the second exhaust;
calculating a flow rate of the additional air based on a stoichiometric amount of oxygen ($O_2$) for converting the second portion of the reformed fuel into the additional carbon dioxide ($CO_2$) and water ($H_2O$) at the second fuel cell; and
regulating a control valve to introduce the additional air into the second fuel cell at the calculated flow rate biased based on the analyzed composition of the second exhaust from the anode of the second fuel cell.

10. A method of operating fuel cell systems, the method comprising:
reforming a fuel containing methane ($CH_4$) with steam to produce a reformed fuel having methane ($CH_4$), carbon monoxide (CO), and hydrogen ($H_2$);
introducing the reformed fuel into an anode of a fuel cell while introducing air into a cathode of the fuel cell;
performing an electrochemical reaction between a first portion of the reformed fuel introduced to the anode and oxygen ($O_2$) in the air introduced to the cathode of the fuel cell to produce electricity and an exhaust from the anode, the exhaust having carbon dioxide ($CO_2$), water ($H_2O$), and a second portion of the reformed fuel;

analyzing a composition of the exhaust from the anode to determine whether a concentration of methane ($CH_4$), carbon monoxide (CO), or hydrogen ($H_2$) in the exhaust is above a threshold; and in response to determining that a concentration of methane ($CH_4$), carbon monoxide (CO), or hydrogen ($H_2$) in the exhaust is above the threshold, actuating a control value to introduce the exhaust as a fuel to an anode of another fuel cell, thereby converting an additional part of the second portion of the reformed fuel into additional carbon dioxide ($CO_2$) and water ($H_2O$).

11. The method of claim 10, further comprising repeating the analyzing and actuating operations until the concentration of methane ($CH_4$), carbon monoxide (CO), or hydrogen ($H_2$) is below the threshold.

12. The method of claim 10, further comprising collecting the generated water ($H_2O$) as steam condensate, thereby producing a product gas having carbon dioxide ($CO_2$) from the exhaust, the product gas having a carbon dioxide ($CO_2$) concentration of about 90% to about 99%.

13. The method of claim 10 wherein:
the fuel cell also includes an electrolyte separating the anode and the cathode, the electrolyte being a solid that physically separates the anode from the cathode; and
performing the electrochemical reaction includes:
generating oxygen anions at the cathode;
transporting the generated oxygen anions from the cathode to the anode via the solid electrolyte; and
reacting the transported oxygen anions with the first portion of the reformed fuel at the anode.

14. A fuel cell system, comprising:
a reformer configured to reform a fuel containing methane ($CH_4$) with steam to produce a reformed fuel having methane ($CH_4$), carbon monoxide (CO), and hydrogen ($H_2$);
a first fuel cell having an anode, a cathode, and an electrolyte separating the anode from the cathode, the anode being configured to receive the reformed fuel while the cathode being configured to receive air having oxygen ($O_2$), wherein the fuel cell is configured to perform an electrochemical reaction between a first portion of the reformed fuel received at the anode and oxygen ($O_2$) in the air received at the cathode to produce electricity and a first exhaust from the anode, the first exhaust having carbon dioxide ($CO_2$), water ($H_2O$), and a second portion of the reformed fuel; and
a second fuel cell coupled to the first fuel cell, the second fuel cell having an anode configured to receive the first exhaust from the anode of the first fuel cell and a cathode configured to receive additional air, wherein the second fuel cell is configured to convert the second portion of the reformed fuel in the first exhaust into additional carbon dioxide ($CO_2$) and water ($H_2O$) in a second exhaust without introducing nitrogen ($N_2$) introduced into the second exhaust.

15. The fuel cell system of claim 14, further comprising a heat exchanger configured to collect the generated water ($H_2O$) in the second exhaust as steam condensate.

16. The fuel cell system of claim 14, further comprising a heat exchanger configured to collect the generated water ($H_2O$) in the second exhaust as steam condensate and producing a product gas having carbon dioxide ($CO_2$) concentration of about 90% to about 99%.

17. The fuel cell system of claim 14 wherein:
the electrolyte of the first or second fuel cell is a solid that physically separates the anode from the cathode; and
the first or second fuel cell is configured to:
generate oxygen anions at the cathode;
transport the generated oxygen anions from the cathode to the anode via the solid electrolyte; and
react the transported oxygen anions with the reformed fuel at the anode.

18. The fuel cell system of claim 14, further comprising:
an analyzer configured to analyze a composition of methane, carbon monoxide, and hydrogen in the second exhaust from the anode of the second fuel cell;
a controller configured to:
determine whether the analyzed composition of methane, carbon monoxide, and hydrogen is below a threshold; and
in response to determining that the analyzed composition is below the threshold, introduce the second exhaust to a heat exchanger to collect the generated water ($H_2O$) in the second exhaust as steam condensate, thereby producing a product gas having carbon dioxide ($CO_2$) concentration of about 90% to about 99%.

19. The fuel cell system of claim 14, further comprising:
an analyzer configured to analyze a composition of methane, carbon monoxide, and hydrogen in the second exhaust from the anode of the second fuel cell;
a controller configured to:
determine whether the analyzed composition of methane, carbon monoxide, and hydrogen is not below a threshold; and
in response to determining that the analyzed composition is not below the threshold, actuate a control valve to introduce the second exhaust to an anode of a third fuel cell.

20. The fuel cell system of claim 19 wherein the controller is configured to repeatedly determine and actual the control value until the concentration of methane ($CH_4$), carbon monoxide (CO), or hydrogen ($H_2$) is below the threshold.

* * * * *